United States Patent
Lange et al.

(10) Patent No.: US 7,681,740 B1
(45) Date of Patent: Mar. 23, 2010

(54) ONE OR TWO PART CONTAINER DRAIN STRAINER ASSEMBLY THAT PREVENTS CLOGGING WHEN DRAINING LIQUIDS FROM CONTAINERS

(75) Inventors: David S. Lange, 21673 Englin Rd., Winnie, TX (US) 77665; William Garland Johnson, Beaumont, TX (US)

(73) Assignee: David S. Lange, Winnie, TX (US)

( * ) Notice: Subject to any disclaimer, the term of this patent is extended or adjusted under 35 U.S.C. 154(b) by 210 days.

(21) Appl. No.: 11/762,167

(22) Filed: Jun. 13, 2007

Related U.S. Application Data

(60) Provisional application No. 60/884,666, filed on Jan. 12, 2007.

(51) Int. Cl.
| | |
|---|---|
| B01D 24/38 | (2006.01) |
| B01D 29/88 | (2006.01) |
| B01D 35/027 | (2006.01) |
| B01D 35/04 | (2006.01) |
| B01D 35/02 | (2006.01) |
| B01D 35/00 | (2006.01) |

(52) U.S. Cl. .................. 210/464; 210/236; 210/455; 210/467; 210/473; 210/477

(58) Field of Classification Search ............. None
See application file for complete search history.

(56) References Cited

U.S. PATENT DOCUMENTS

| 3,462 | A | * | 3/1844 | Simons ................. 156/164 |
|---|---|---|---|---|
| 217,055 | A | * | 7/1879 | Buckley ............. 222/189.07 |
| 413,748 | A | * | 10/1889 | Bowman ................ 210/467 |
| 450,932 | A | * | 4/1891 | Gibson ................ 222/189.07 |
| 463,505 | A | * | 11/1891 | Glynn ..................... 210/464 |
| 691,052 | A | * | 1/1902 | Freeman ............. 222/189.07 |
| 708,544 | A | * | 9/1902 | Guenzel ................. 210/467 |
| 797,266 | A | * | 8/1905 | Conklin .............. 222/189.07 |
| 817,397 | A | * | 4/1906 | Skinner .............. 222/189.07 |
| 817,452 | A | * | 4/1906 | Skinner .............. 222/189.07 |
| 946,205 | A | * | 1/1910 | Daniels .................. 210/467 |
| 1,079,280 | A | * | 11/1913 | Willard ............. 222/189.07 |
| 1,384,926 | A | * | 7/1921 | Smith ..................... 210/238 |
| 1,694,743 | A | * | 12/1928 | Hinman ................. 210/460 |
| 2,521,013 | A | * | 9/1950 | Margolis ................ 210/463 |
| 5,672,274 | A | * | 9/1997 | Wheeler et al. ......... 210/474 |
| 6,079,316 | A | * | 6/2000 | Barden et al. ............ 99/297 |

* cited by examiner

*Primary Examiner*—Krishnan S Menon
*Assistant Examiner*—Benjamin Kurtz
(74) *Attorney, Agent, or Firm*—Buskop Law Group, PLC; Wendy Buskop

(57) ABSTRACT

A two part drain assembly for a container assembly with a drain for flowing fluid from the interior of the container assembly to exterior of the container assembly. A back plate comprising a first sliding engagement means parallel a second sliding engagement means connected by a back plate body, wherein a drain attachment hole is disposed on the back plate body and a bottom plate is disposed perpendicular to the first sliding engagement means and the second sliding engagement means. A front cover comprising a plurality of flow holes for slidably engaging simultaneously the first sliding engagement means and the second sliding engagement means, wherein the front cover forms an enclosed hollow chamber when slidably engaged with the back plate thereby permitting fluid to flow from the interior of the container assembly into the hollow chamber while excluding particles from entering the enclosed hollow chamber.

25 Claims, 15 Drawing Sheets

ONE OR TWO PART CONTAINER DRAIN STRAINER ASSEMBLY THAT PREVENTS CLOGGING WHEN DRAINING LIQUIDS FROM CONTAINERS

CROSS REFERENCE TO RELATED APPLICATION

The present application claims priority to U.S. Provisional Patent Application Ser. No. 60/884,666 filed on Jan. 12, 2007.

FIELD

The present embodiments relate generally to a drain assembly for a container assembly with a drain for flowing fluid from the interior to the exterior of the container assembly, particularly a cooler.

BACKGROUND

There exists a need for a drain assembly for a container assembly, such as a cooler, that can prevent the container assembly drain from becoming clogged with interior or exterior contents, such as food, meat, seafood, bottle and jar labels, plastic bags, foliage, and other contents when draining excess liquid from the container assembly.

There exists a need for a drain assembly that can be installed both during production and manufacture of a container assembly, or made available for after market installation in a pre-existing container assembly, and can be adapted to fit within any container assembly with a drain.

There exists a need for a container assembly that eliminates the need for lifting heavy coolers and other container assemblies to dump excess liquid when the drain is clogged.

The present embodiments meet these needs.

BRIEF DESCRIPTION OF THE DRAWINGS

The detailed description will be better understood in conjunction with the accompanying drawings as follows.

Figure 1:
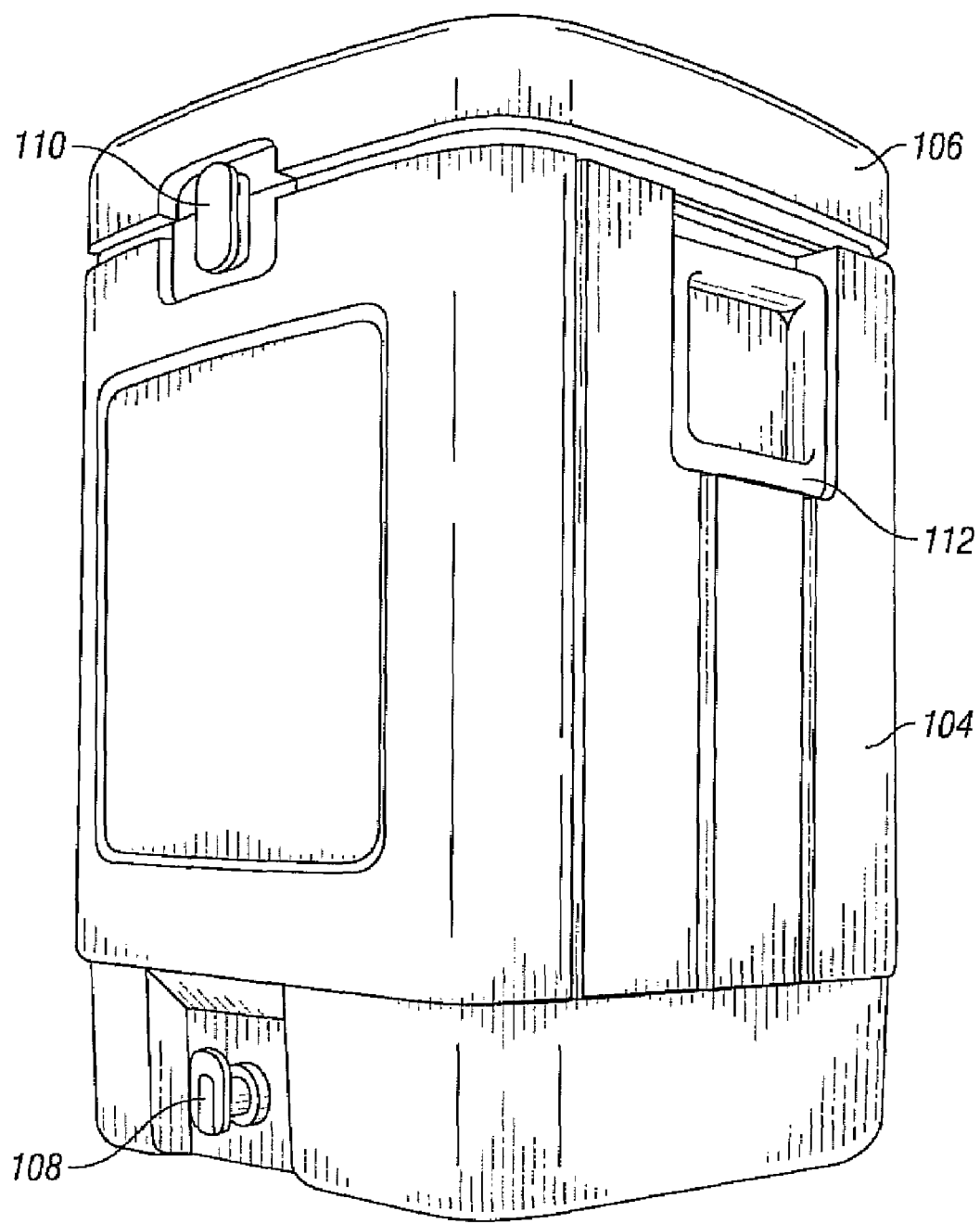
FIG. 1 depicts an insulated container assembly useable with the present invention.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present drain assembly possesses the advantage of being extremely user-friendly, able to be installed easily in a container assembly, such as a cooler, using only one or two tools, such as an Allen wrench or a crescent wrench. Installation of the present drain assembly can be completed in only a few minutes, such as one to five minutes. The present drain assembly is also easily removable, within one to five minutes, for cleaning or replacement. Typically, the present two-part drain assembly can be cleaned by removing only a slidable front cover.

Another advantage of the present drain assembly is that the present drain assembly allows a heavy container assembly, such as a cooler filled with beverages, ice, food, fish, or raw meat, to be reliably drained using a built-in drain hole by preventing cooler contents and other materials from clogging the drain hole. The present drain assembly thereby eliminates the need to lift container assemblies, which prevents damage to the container and container components, such as lids, hinges, straps, clasps, and drains.

The elimination of the need to lift container assemblies reduces the number of damaged containers and non-biodegradable plastic parts present in landfills. The present drain assembly also reduces the risk of personal injuries caused by lifting, such as back injuries, or injuries caused by accidentally dropping the container, such as foot injuries. The present drain assembly also allows a cooler assembly to be more readily useable by a person having a physical impairment, a young child, or a person lacking upper body strength.

The present drain assembly provides a further advantage by eliminating the need to reach into a full cooler or other container to attempt to unclog a drain that has become clogged with cooler contents or other materials. Removing the need to reach into a container assembly prevents potential hand injuries caused by sharp or heavy objects within a container, by broken glass unknowingly present in an ice-filled cooler, or by shrimp, fish, crab, or crawfish fins, shells, and pincers when seafood is stored or transported.

By preventing a drain hole from clogging, the present drain assembly reduces the costs and inconvenience associated with lost ice caused by exposure to the outside environment when a container assembly must be opened frequently due to a clogged drain. Additionally, ice and the contents of a container assembly can be lost when the container must be physically lifted and dumped due to a clogged drain hole. The present drain assembly thereby prolongs the amount of time the contents of a cooler or other container can be kept fresh and cold.

Further, by reducing the need to open the lid of a container assembly, the present drain assembly helps to prevent insects, such as flies, bees, maggots, and wasps from entering the container assembly. The minimization of the need to open the lid of a container assembly is especially advantageous when a container assembly is used by a hunter or fisherman to store and transport raw meat or seafood, which can readily attract insects and parasites, and must often be kept fresh and cold for extended periods of time.

The retention of ice using the present drain assembly is also advantageous for the transport and storage of live seafood, such as crabs, lobster, and crawfish. Live seafood can drown in excess water created by melting ice. Thus, both minimizing melted ice by reducing the need to open a container lid, and maintaining an unclogged drain hole to allow melted ice to drain from the container assembly is advantageous when storing and transporting live seafood.

By maintaining an unclogged drain hole, the present drain assembly can receive a water hose which can be used to remove water and other fluids from a container assembly and deposit the fluid remote from the container. By eliminating the need to manually dump the contents of a container assembly close to a home, potential damage to homes and landscaping can be avoided.

The present embodiments relate to a two part drain assembly for a container assembly having a drain for flowing fluid from an interior of the container assembly to an exterior of the container assembly. The present two part drain assembly is adapted to prevent particles and materials from clogging the drain of the container assembly.

A container assembly can be an ice chest or a cooler, which can include a built-in patio cooler, an industrial sized ice chest, a mini-portable ice chest, and other similar coolers and ice chests having insulated shells. The container assembly can be a cooler available from Igloo, of Houston, Tex., such as a 150 qt Quick and Cool™ cooler, or a cooler available from Coleman Wichita, Kans., such as a 50-qt Ultimate Extreme™ cooler. Drains of coolers and ice chests often become clogged with labels and wrappers from beverage containers, pieces of food, paper goods, such as plates, paper towels, and napkins, and similar items.

A container assembly can also include a container in an ice machine for holding ice. The present drain assembly can be secured to the outlet port of the container. Drains of ice machines can often become clogged with slime, mold, and debris left by users.

It is also contemplated that a container assembly can include a container for transporting seafood in association with commercial fishing fleets, which can become clogged with seaweed, parts of fish and other marine life, sediment, and waterborne debris. A container assembly could also include a live well, a bilge, or a built in ice storage area for keeping seafood fresh, found in a recreational boat, such as a twenty-foot to fifty-eight foot luxury yacht.

A container assembly can also include an industrial-sized container for preparing foods, such as a kettle, which can become clogged with food particles, such as potato peels, chunks of meat, closely-packed grains, and similar objects.

It is also contemplated that a container assembly can include a container used in the preparation of honey, wherein the present two-part drain assembly is used as a separator for filtering honey from beeswax to allow free flowing of the honey. Use of a food container having a two-part drain assembly for straining or separating soups, stews, and similar food items is also contemplated.

A container assembly can also include a tank or vessel used to store or transport crude or processed oil, fluidized chemicals, bio-diesel products, and similar fluids, which can also cause a drain to become clogged due to the presence of solid and semi-solid particles and chemicals.

It is further contemplated that a container assembly can include a stock tank for watering animals. Animals can often deposit hay or grass in a stock tank, which can cause a stock tank drain to become clogged. It is also contemplated that a container assembly can include a dip tank for treating animals for parasites, which can become clogged by animal hair or external debris.

In a further contemplated embodiment, a container assembly can be an aquarium, such as a fish tank. Large aquariums, such as those used to contain and display marine life, marine habitats, and ecosystems are also contemplated. Drains in aquariums can become clogged with waste from fish and other marine life, food for marine life, mold and algae, sediment, or small rocks.

It is also contemplated that a container assembly can include a container within a cooling tower, which can become clogged with particles and solid materials, creating potentially dangerous or deadly malfunctions.

A container assembly can also include a swimming pool, such as an above ground swimming pool, which can be subject to clogging from external debris, such as foliage.

A container assembly can further include a toilet or urinal, which can become clogged by bathroom tissue, paper towels, litter left by patrons, and similar items. The present two-part drain assembly can be made from porcelain or ceramic and molded or secured within a urinal to prevent clogging by debris.

In an embodiment, the container assembly can be a portable container assembly, such as a cooler used by a hunter or a fisherman to store raw meat or seafood, or by a family to store food and drink while traveling. Often, labels from beverage containers, pieces of food, or chunks of raw meat or seafood can clog the drain of a portable container assembly.

The size of the present two-part drain assembly and each part of the assembly can vary depending on the size and nature of the container assembly.

The present two-part drain assembly includes a back plate and a front cover.

The back plate has a back plate body having a drain attachment hole in communication with the drain of the container assembly. The back plate body can have any dimensions, depending on the size and nature of the container assembly. In a contemplated embodiment relating to a cooler having a length of 41.75 inches, a width of 18.25 inches, and a height of 22.75 inches, the back plate body can be three inches wide and five inches long.

The size and shape of the drain attachment hole can vary, depending on the size and nature of the drain of the container assembly and the rate at which the container assembly is intended to be emptied. In the contemplated embodiment relating to a cooler having a length of 41.75 inches, a width of 18.25 inches, and a height of 22.75 inches, the drain attachment hole can be round and have a diameter of 0.75 inches. The drain attachment hole can be selectively designed so that the drain hole on a container assembly would correspond to the size and shape of the drain attachment hole.

In an embodiment, the drain attachment hole can have a nipple with threads or other engagement means for securing to the drain of a container assembly.

A first sliding engagement means and a second sliding engagement means are connected to the back plate body. Each sliding engagement means can include a track for receiving a rail. Each track can have a stop for securing the rail in the track. It is contemplated that each sliding engagement means can extend across the length of the back plate body, however a shorter sliding engagement means can also be used.

Each sliding engagement means can also include a plastic groove and channel system. In lieu of or in addition to each sliding engagement means, one or more fasteners, such as snaps, screws, bolts, or clips can be used to secure the front cover to the back plate.

Each sliding engagement means can be molded or welded to the back plate body. Each sliding engagement means can also be adhesively secured to the body, such as by using a waterproof, industrial strength glue or epoxy. It is also contemplated that the first sliding engagement means, the second sliding engagement means, and the back plate body can be a one-piece construction.

A bottom plate can be connected to the back plate body. The bottom plate can have any dimensions, depending on the size and nature of the container assembly. In the contemplated embodiment relating to a cooler having a length of 41.75 inches, a width of 18.25 inches, and a height of 22.75 inches, the bottom plate can be three inches wide and two inches long.

The bottom plate can be molded or welded to the back plate body. The bottom plate can also be adhesively secured to the body. In an embodiment, the bottom plate can be omitted.

It is contemplated that the bottom plate, each sliding engagement means, and the back plate body can be a one-piece construction. It is further contemplated that the back plate, the bottom plate, each sliding engagement means, or combinations thereof can be molded or otherwise incorporated within a container assembly, such as a cooler having a back plate molded as part of an interior wall having a drain. It is also contemplated that the back plate and the drain of the cooler assembly can also be molded or otherwise formed as a one-piece construction.

The bottom plate can have any shape, including a "D" shape, a rectangular shape, a semi-round shape, a tubular shape, a round shape, a mushroom-like shape, a sunburst shape, a studded shape, or another similar shape.

In a contemplated embodiment, the bottom plate can provide a sliding tight fit with the first sliding engagement means and the second sliding engagement means. The bottom plate can function as a stop for securing a rail within each sliding engagement means.

The back plate, which includes the back plate body, each sliding engagement means, and can include the bottom plate, can be made from any durable material able to withstand a temperature ranging from −40 degrees Fahrenheit to 118 degrees Fahrenheit without breaking. It is contemplated that the back plate can be made from a metal that has been treated or coated to resist corrosion and wear due to water, or other similar materials.

The back plate can be made from molded plastic, molded polyvinyl chloride, polypropylene, copolymers of polypropylene, stainless steel, stainless steel wire mesh, galvanized wire mesh, plastic coated wire mesh, wire mesh coated to resist rust, ultraviolet light and radiation, and chemicals and corrosives, galvanized stainless steel, metal having a coating that is resistant to rust, ultraviolet light and radiation, and other chemicals and corrosives, and combinations thereof. The back plate can also be made from porcelain or ceramic.

In an embodiment, the back plate can be made from a material able to withstand a temperature ranging from −40 degrees Fahrenheit to 500 degrees Fahrenheit, or more, without breaking. While it is contemplated that most coolers are typically exposed to temperatures ranging from −40 degrees Fahrenheit to 118 degrees Fahrenheit, other container assemblies, such as climate control systems and food preparation containers can withstand significantly greater temperatures.

It is contemplated that the back plate body, each sliding engagement means, and the bottom plate can be made from different materials, or identical materials.

A front cover having a plurality of flow holes is adapted to slidably and simultaneously engage each sliding engagement means. When the front cover is placed over the back plate body, the front cover and back plate define an enclosed hollow chamber permitting fluid to flow from the interior of the container assembly into the enclosed hollow chamber while excluding particles that are unable to fit through the flow holes.

The size of the enclosed hollow chamber can vary, depending on the size and application of the container assembly. In the contemplated embodiment relating to a cooler having a length of 41.75 inches, a width of 18.25 inches, and a height of 22.75 inches, the volume of the enclosed hollow chamber could range from two cubic inches to thirty cubic inches.

Fluid from the hollow chamber can then flow through the drain attachment hole and the drain to the exterior of the container assembly.

The front cover can have any dimensions, depending on the size and nature of the container assembly. In the contemplated embodiment relating to a cooler having a length of 41.75 inches, a width of 18.25 inches, and a height of 22.75 inches, the front cover can be three inches wide and five inches long, rounded in shape, and have a height sufficient to create an enclosed hollow chamber between the front cover and the back plate having a volume ranging from two to thirty cubic inches.

The front cover can have any number of flow holes. In a contemplated embodiment, the number of flow holes can range from ten holes to 100 holes. Each flow hole can have a diameter ranging from $11/64^{th}$ of an inch to two inches or more, depending on the size of the particles intended to be filtered and the size and application of the container assembly. The flow holes can have a staggered arrangement, or any other arrangement. The size of each flow hole can be identical, or the size of individual flow holes can differ. The size of each flow hole should be smaller than that of the drain in the container assembly to ensure that the flow holes prevent the drain from clogging.

The front cover can be made from the same material as the back plate, or from a different material able to sustain a temperature ranging from −40 degrees Fahrenheit to 118 degrees Fahrenheit without breaking. The front cover can also be made from a material able to sustain a temperature ranging from −40 degrees Fahrenheit to 500 degrees Fahrenheit, or more, without breaking In a contemplated embodiment, the bottom plate can also include one or more flow holes. In another contemplated embodiment, the present two-part drain assembly can be raised from the interior of the container assembly, rather than flush against the interior, and the back plate can include one or more flow holes.

In an embodiment, the present drain assembly can include a fastener assembly, such as a clasp, a hook with a catch, one or more screws, or one or more bolts, for securing the front cover to the back plate. One or more raised pins can be disposed on the front cover or the back plate, for receipt in a complementary locking groove of the other part of the two-part drain assembly.

In a contemplated embodiment, the front cover can have a triangular shape having a tapered top for engaging the back plate. It is also contemplated that the front cover can have a tapered top having a similar dimension to the bottom plate for engaging the back plate and forming the enclosed hollow chamber.

In another embodiment, the front plate of the two-part drain assembly can have an undulating curved surface, such as a curve like that of a sine wave, for providing additional effectiveness and strength. Any number of flow holes can be located at the peak, at the trough, and along the undulating curved surface. The size of each curve and the number of curves can vary depending on the application of the two-part drain assembly.

In a contemplated embodiment for use within a cooler, each curve or corrugation can have a height of about 0.5 inches and a width of about 0.5 inches at the base. From four to six curves can be included in the front cover, depending on the width of the two-part drain assembly. From two to twenty curves can be included in the top plate of a two-part drain assembly having a diameter ranging from one inch to five inches.

A tube can be connected to the exterior of the drain assembly at approximately a ninety degree angle. The tube can have a stop which can support a chlorine tablet, such as a chlorine tablet made by DuPont, so that water can flow through the tube, past the chlorine tablet, into the drain assembly, forming a drain assembly that reduces algae buildup in air conditioning units or swimming pools. The tube can have a diameter ranging from one inch to four inches, as needed to accommodate an appropriately-sized chlorine tablet. Multiple chlorine tablets can be placed within the tube, enabling upper tablets to purify water after lower tablets have dissolved. Flow holes can be disposed on the tube and the bottom plate to allow the chlorine tablets to purity liquids within the container assembly.

It is also contemplated that the front plate can have an angular pattern or sunburst-like pattern, having at least one flow hole on each point of the angular pattern and at least one hole between each point of the angular pattern. In a contemplated embodiment, each angular point can range from 0.5 inches to six inches, depending on the application of the two-part drain assembly. Each point can be spaced between 0.25 inches and twelve inches or more, depending on the application of the two-part drain assembly. Each point can have multiple flow holes along the entire conical or angled surface of the point. In an embodiment intended for use in a cooler, from eight to fifty points can be on the front cover of the two-part drain assembly.

It is further contemplated that the front cover can have a studded, or egg-carton-like configuration, having a plurality of studs and at least one flow hole disposed on each stud. It is also contemplated that at least one flow hole can be between each stud. Each stud can range in height from 0.5 inches to one foot. Each stud can be a square-topped pyramid having a width of 0.5 inches at the base and 0.25 inches at the top, however in larger applications, each stud can have a width of one foot at the bottom and six inches at the top. Each stud can be spaced from 0.25 inches to 6 inches or more apart. The size, spacing, and configuration of the studs can vary depending on the size and nature of the container assembly.

In one embodiment of the present invention, a container assembly can have a drain assembly holder embedded within the interior of the container assembly. The container assembly can have an insulated shell with a drain for flowing fluid from the interior of the container assembly to the exterior of the container assembly. The drain assembly holder can include a back plate, as described previously, which is secured substantially flush to the interior of the container assembly, such that the drain attachment hole of the back plate is in communication with the drain of the container assembly. The back plate is adapted to slidably engage a front cover, as described previously, for filtering fluids.

The back plate can be secured to the interior of the container assembly by molding, welding, fasteners, adhesives, and other, similar means. The back plate and the container assembly can also be a one-piece construction.

In a contemplated embodiment, the present two part drain assembly can be used in containers of air conditioning units. The two-part drain assembly can have a bottom plate having a plurality of holes which slidably engages a top plate. The top plate can have an undulating curved configuration, such as the shape of a sine wave, to provide improved strength and effectiveness while preventing clogging. The two-part drain assembly can further have an inner cylindrical chamber having inner cylindrical walls with a plurality of holes. It is contemplated that water-soluble objects, such as chlorine tablets and similar items, can be placed within the inner cylindrical chamber for cleaning and purifying water which flows through the two-part drain assembly.

The assembled two-part drain assembly can range from two to three inches in height and can be raised approximately 0.25 inches from the bottom of an air conditioner pan. The two-part drain assembly can be slightly shorter than the depth of the air conditioner pan.

In another contemplated embodiment, the present two-part drain assembly can be installed in containers lacking lids or full enclosure, such as sinks, bathtubs, water treatment tanks, culverts, stock tanks, swimming pools, and other similar open containers. The present two-part drain assembly can also be used within gutter systems and down spouts of a residence or commercial building.

In a further contemplated embodiment, the present two-part drain assembly can be adapted for use in the food and beverage industry, such as for filtration during the preparation of wines, beers, juices, and similar products. It is further contemplated to use the present two-part drain assembly on restaurant steam tables, ice serving tables, and serving bars. The present two-part drain assembly can also be used in steam kettles and similar containers.

A contemplated embodiment also includes use of the present two-part drain assembly in a recreational vehicle having a bilge, live well, or similar outflow container, such as a jet ski, a trailer truck, tanker truck, a truck for transporting fish or seafood with ice, trucks for transporting oil or fluidized chemicals, or a water system having an outflow, such as a fish tank or aquarium. Use of the present two-part drain assembly in a bed of a personal pick-up truck is also contemplated.

Every part of the present two-part drain assembly can be coated, painted, or dyed one or more selected colors, or molded or otherwise crafted from a colored material. For example, the present two-part drain assembly could be colored pink to promote breast cancer awareness. The two-part drain assembly could also be colored white so that it is easily recognizable when the front plate of the drain assembly requires cleaning. The two-part drain assembly could also be colored a dark green, or colored with a camouflage pattern to indicate an affinity for recreational hunting or support for the armed forces. Any color or combination of colors can be used for any utilitarian or aesthetic purpose.

Now referring to the Figures, FIG. 1 depicts an insulated container assembly having a chest 104 and a lid 106. While FIG. 1 depicts a cooler designed to hold water or other liquids and has a spigot 108 for dispensing the contents of the container assembly, any other type of container assembly having any shape or purpose, such as picnic coolers, ice chests, and other containers can also be used.

The front of lid 106 is secured to the top of chest 104 by a rotating latch 110 which is secured to chest 104. While the contents of chest 104 can be emptied by opening lid 106, emptying chest 104 in this manner would require lifting chest 104, exposing the contents of chest 104 to ambient temperatures and foreign materials and debris, and risks inadvertently losing contents of chest 104 when emptying chest 104 through open lid 106.

A handle 112 for lifting the container assembly is pivotally mounted in a recess disposed on chest 104. An identical handle can be mounted on the opposite side of the cooler.

It is contemplated that the container assembly can include an outer plastic shell or casing and an inner plastic shell or liner. The casing can be filled with insulating plastic foam which can harden when it cures, providing the container assembly with structural rigidity as well as insulation. The casing and the liner can be formed from polyethylene, and the foam can be polyurethane. The lid of the container assembly can similarly include an outer polyethylene shell and a filler of insulating polyurethane foam.

Figure 2:
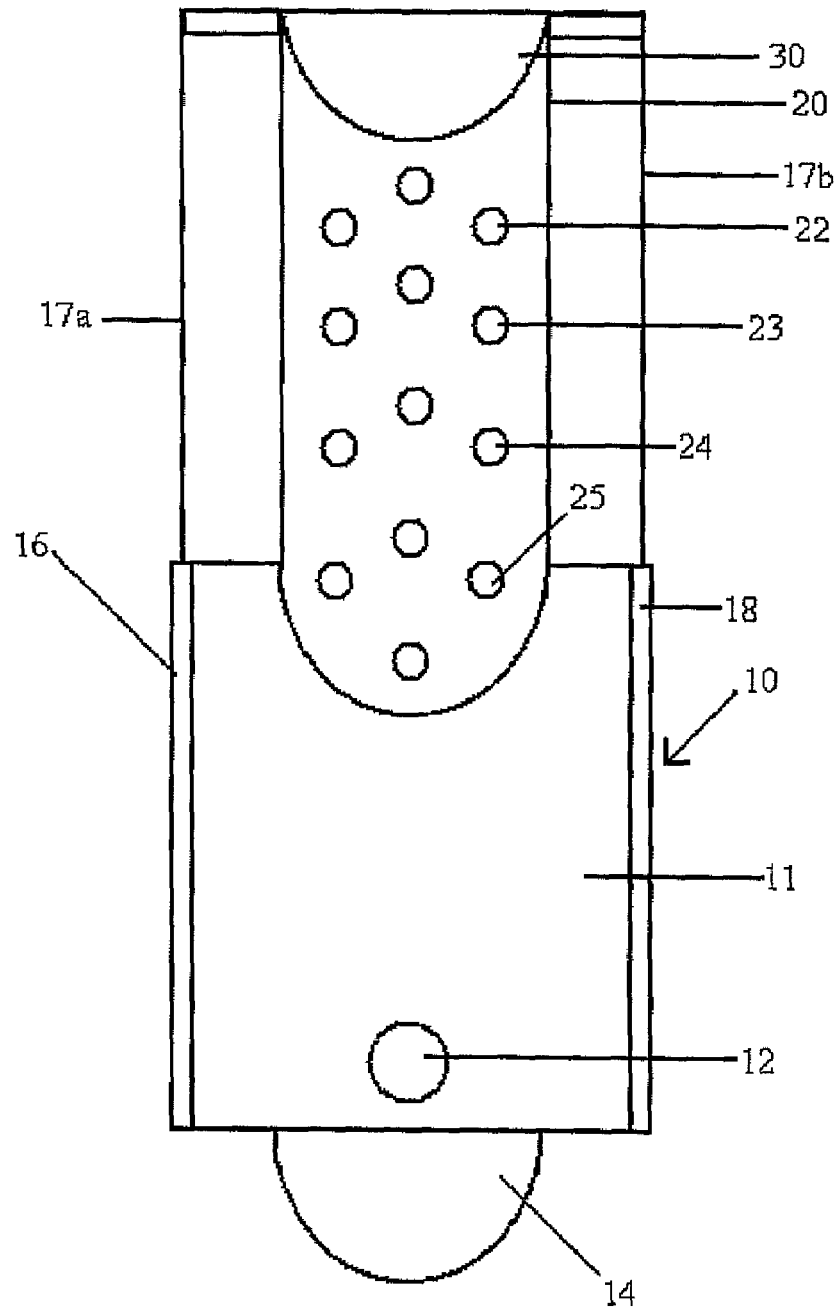
FIG. 2 depicts a front view of a back plate and a front cover of the present two part drain assembly.

FIG. 2 depicts a front view of an embodiment of the present two part drain assembly. The two part drain assembly has a back plate 10 with includes a back plate body 11 connected to both a first sliding engagement means 16 and a second sliding engagement means 18. First sliding engagement means 16 and second sliding engagement means 18 are depicted as tracks for receiving rails 17a and 17b.

The back plate also has a drain attachment hole 12 and a bottom plate 14.

FIG. 2 additionally depicts the front cover 20 with a plurality of flow holes 22, 23, 24, 25 (only four are labeled). The front cover slidably engages simultaneously the first sliding engagement means 16 and the second sliding engagement means 18. A hollow chamber 30 is created from the front cover 20 sliding into the back plate 10.

Figure 3:
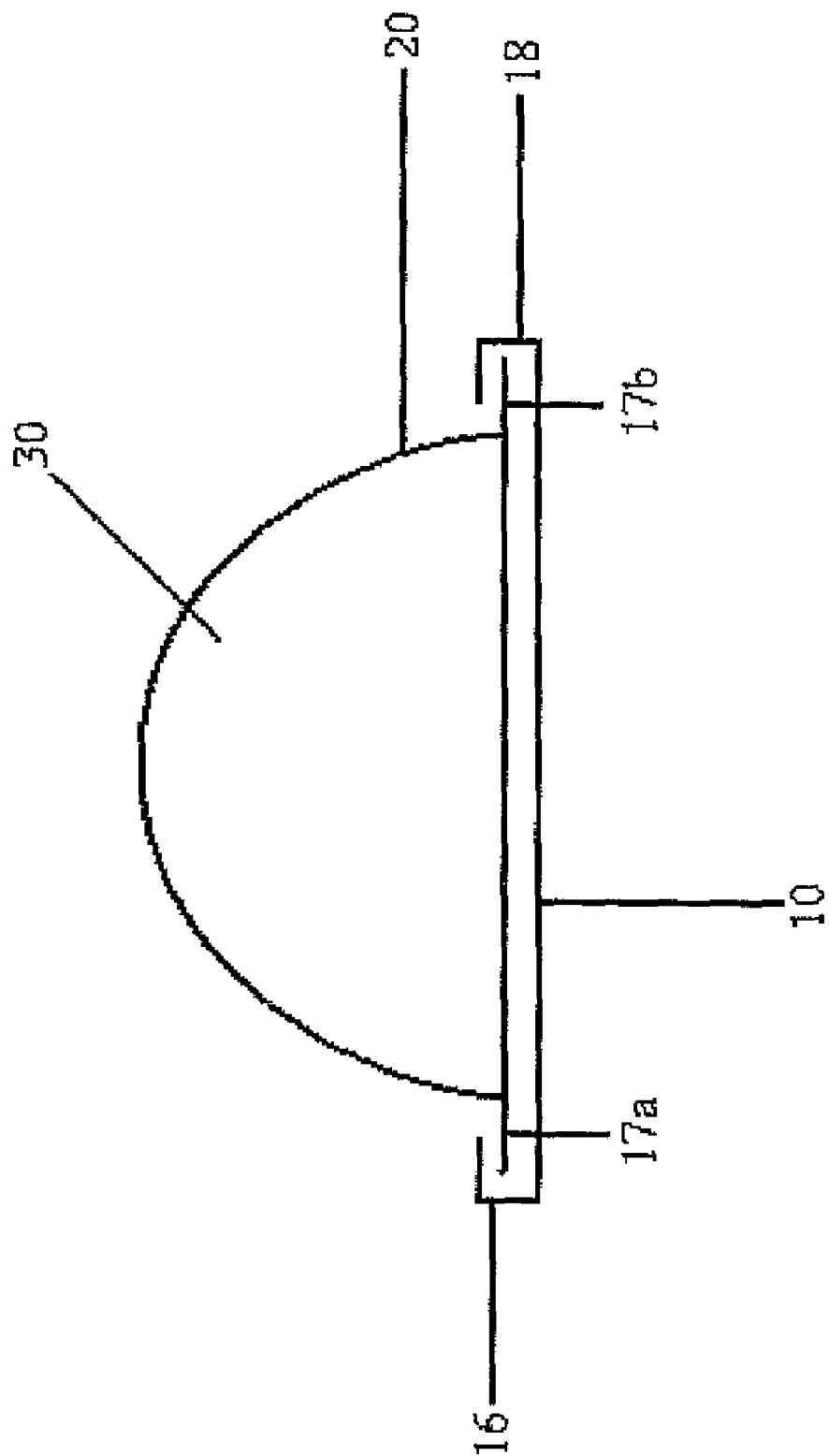
FIG. 3 depicts a bottom view of a slidably engaged front cover and bottom plate.

FIG. 3 depicts a bottom view of a slidably engaged front cover and bottom plate. Front cover 20 is depicted sliding into back plate 10. The first sliding engagement means 16 and the second sliding engagement means 18 encompass the front cover 20, forming enclosed hollow chamber 30, which is defined by front cover 20 and back plate 10. First sliding engagement means 16 and second sliding engagement means 18 are depicted as tracks for receiving rails 17a and 17b attached to front cover 20.

Figure 4:
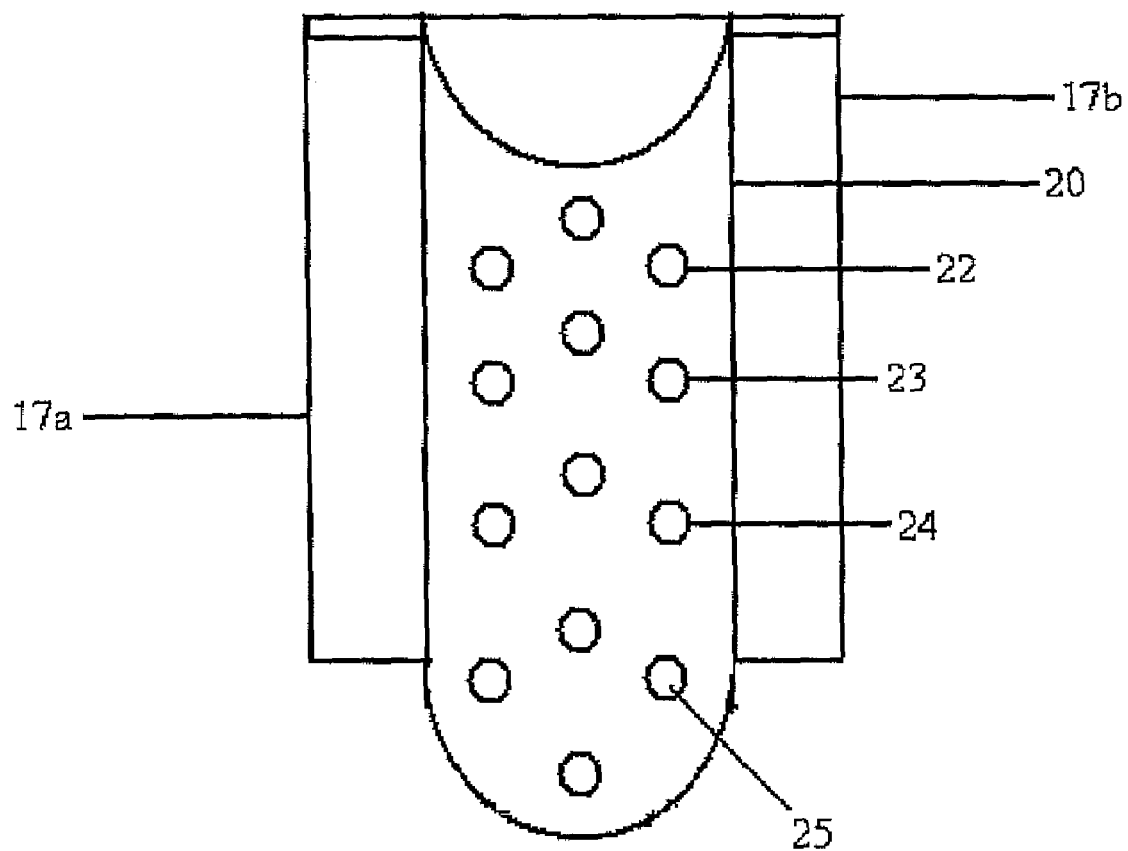
FIG. 4 depicts a front view of a front cover.

FIG. 4 depicts a front view of the front cover 20. Front cover 20 has a plurality of flow holes 22, 23, 24, and 25. Front cover 20 can have any number of holes depending on the size and nature of the present drain assembly. Front cover 20 is also depicted having rails 17a and 17b for engaging with sliding engagement means that include tracks.

Figure 5:
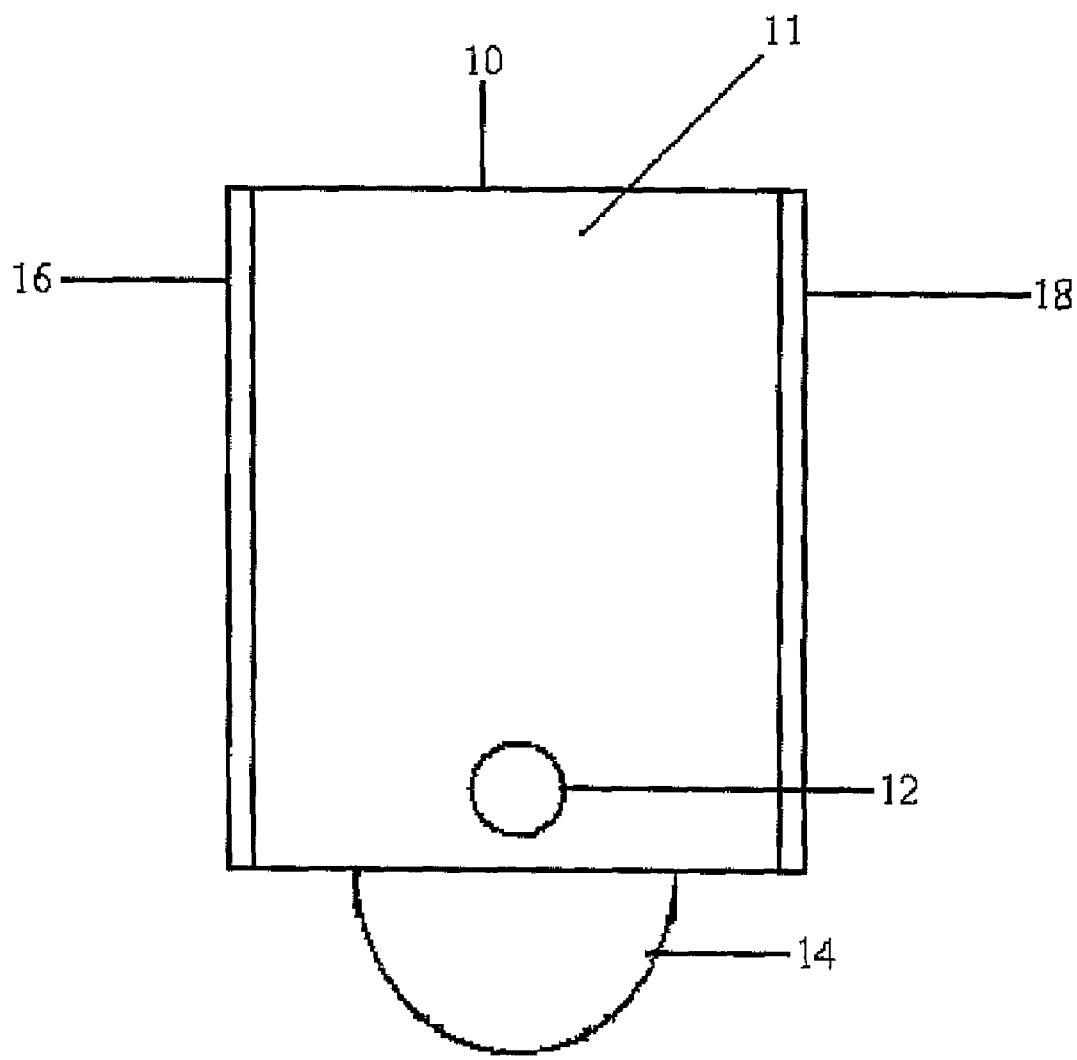
FIG. 5 depicts a front view of a back plate.

FIG. 5 depicts a front view of the back plate 10. Back plate 10 has a back plate body 11. A first sliding engagement means 16 and a second sliding engagement means 18 are disposed on either side of the back plate body 11. First sliding engagement means 16 and second sliding engagement means 18 are depicted as tracks for receiving rails. A bottom plate 14 is disposed at the bottom of the back plate 10. The back plate also has a drain attachment hole 12.

Figure 6:
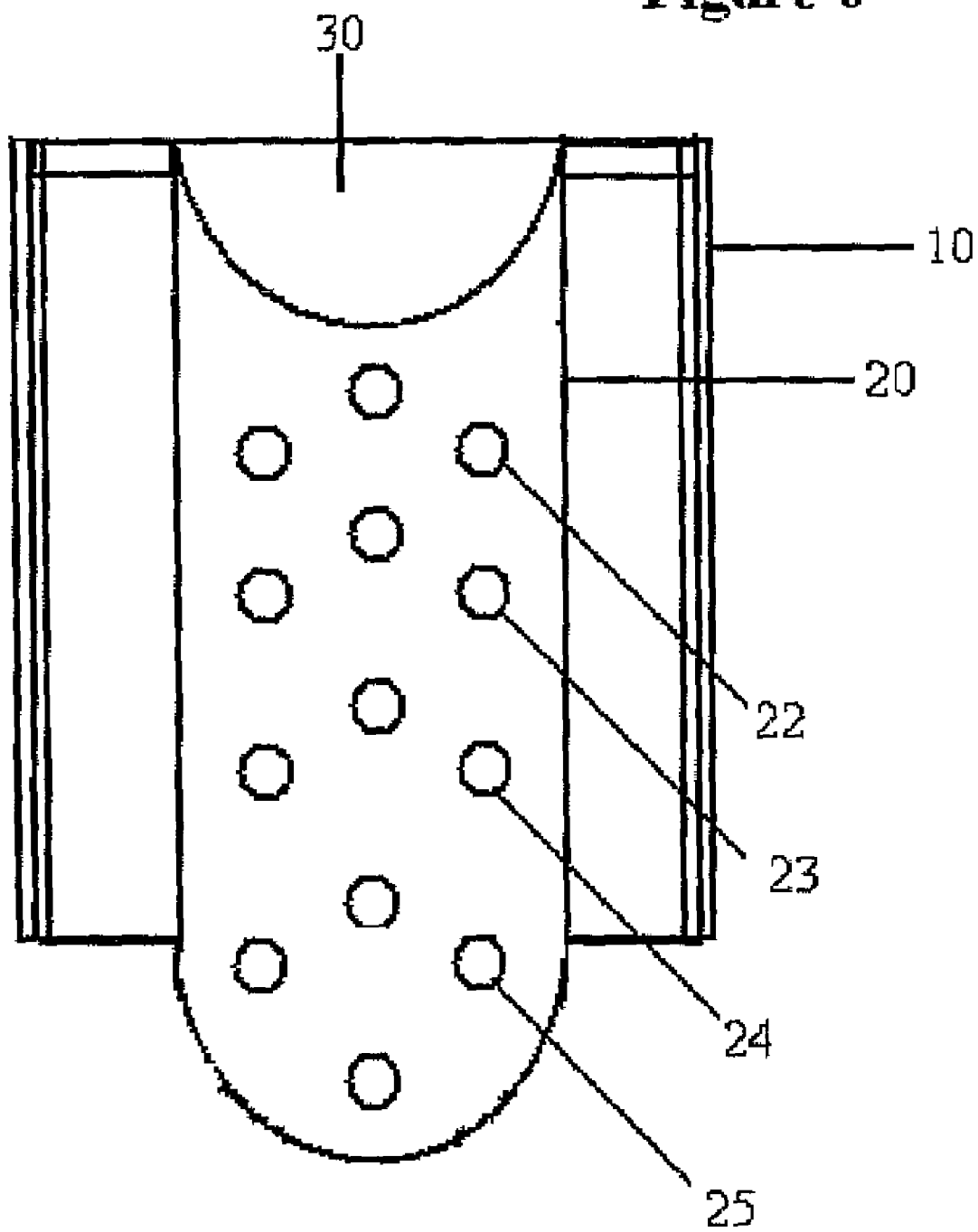
FIG. 6 depicts a front view of the two part drain assembly having a front cover and back plate slidably engaged.

FIG. 6 depicts a front view of the two part drain assembly with the front cover 20 slidably engaged with the back plate 10.

When slidably engaged, front cover 20 and back plate 10 define an enclosed hollow chamber 30. The plurality of flow holes 22, 23, 24, 25 disposed within the front cover 20 allow fluids to access the enclosed hollow chamber 30, while the plurality of flow holes 22, 23, 24, 25 prevent particles larger than the diameter of any individual flow hole from entering enclosed hollow chamber 30. Fluid from enclosed hollow chamber 30 can then be drained through a drain attachment hole in the back plate 10 without the drain attachment hole becoming clogged with particles and materials that are retained outside of the enclosed hollow chamber 30 by the front cover 20.

Figure 7:
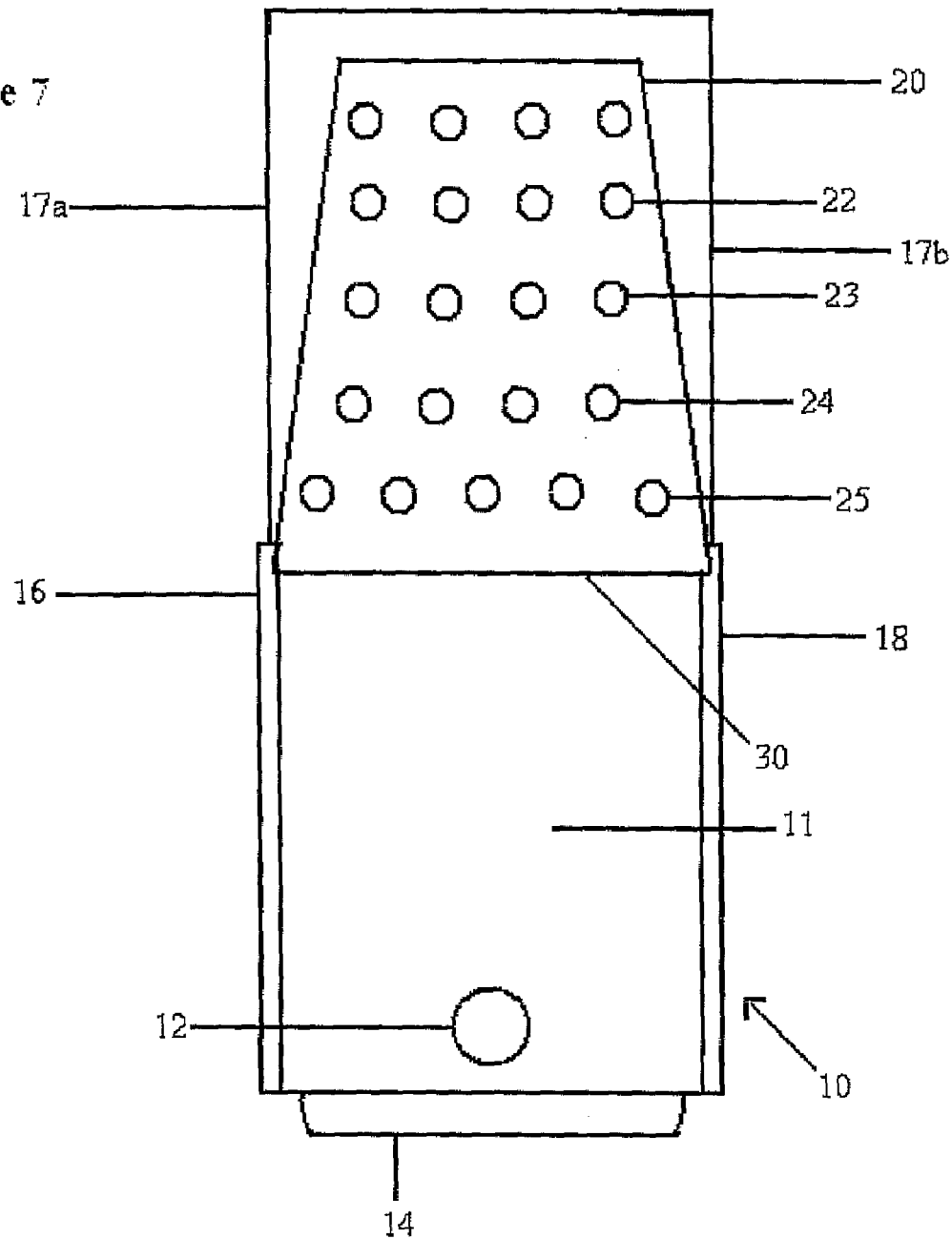
FIG. 7 depicts a front view of an alternate embodiment of the back plate and front cover of FIG. 2 having a rectangular shaped front cover.

FIG. 7 depicts a front view of an alternative embodiment of the two part drain assembly wherein the front cover 20 is rectangular in shape and tapered at the top. The front cover has a plurality of flow holes 22, 23, 24, 25 (only four are labeled). The front cover slidably engages simultaneously the first sliding engagement means 16 and the second sliding engagement means 18 disposed on the back plate 10. First sliding engagement means 16 and second sliding engagement means 18 are depicted as tracks for receiving the left edge 17a and the right edge 17b of front cover 20, which act as rails.

An enclosed hollow chamber 30 is defined when the front cover 20 slidably engages the back plate 10.

Back plate 10 is depicted having a back plate body 11 and a drain attachment hole 12. A bottom plate 14 is attached to the back plate 10.

Figure 8:
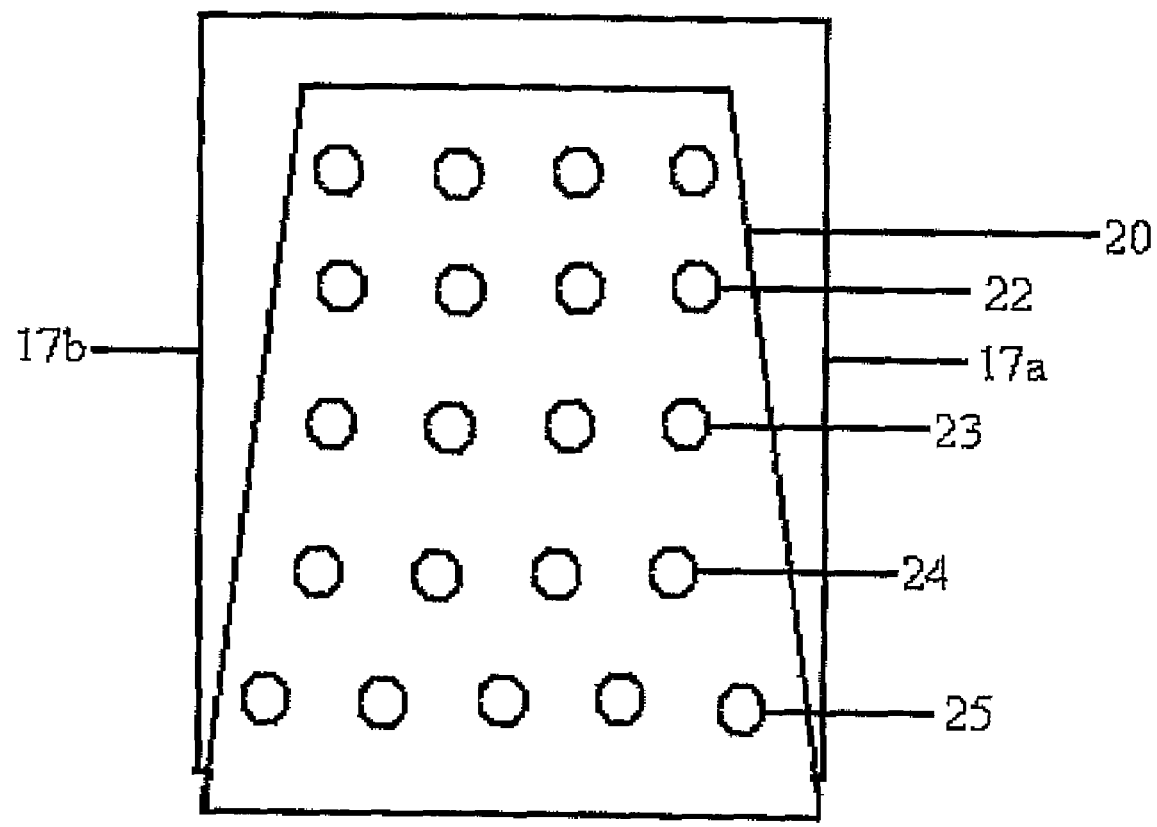
FIG. 8 depicts a front view of the front cover of FIG. 7.

FIG. 8 depicts a front view of the rectangular embodiment of the front cover 20. The front cover 20 is depicted having a plurality of flow holes 22, 23, 24 25. The front cover 20 also has a left edge 17a and a right edge 17b, which act as rails for slidably engaging tracks disposed on a back plate.

Figure 9:
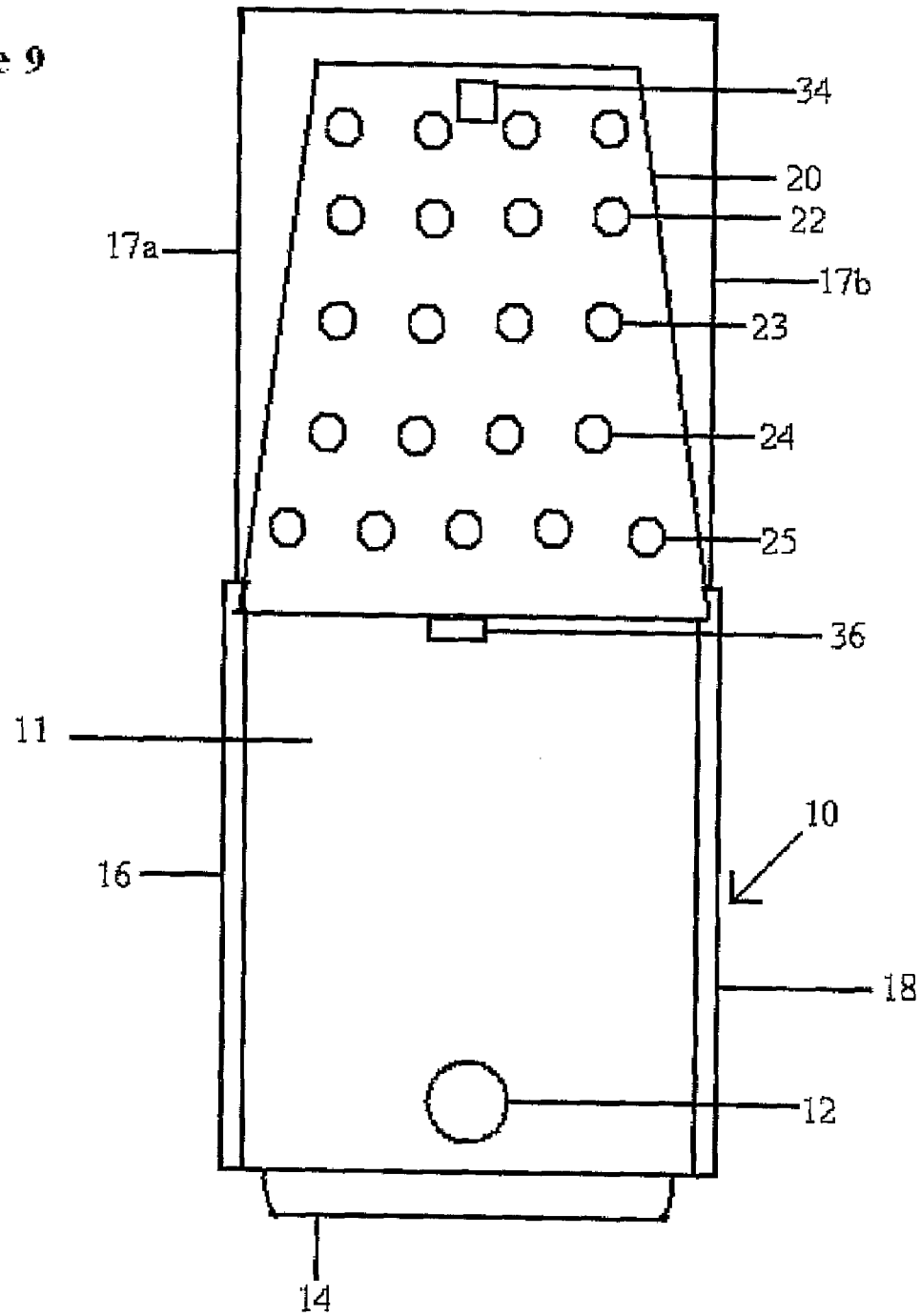
FIG. 9 depicts a front view of an alternate embodiment of the back plate and front cover of FIG. 7 having a fastener assembly.

FIG. 9 depicts a front view of the rectangular embodiment of two part drain assembly having a fastener assembly. The fastener assembly includes a hole 34 disposed on the front cover 20 and a protrusion 36 disposed on the back plate 10. The protrusion 36 can be a piece of metal, plastic, or another rigid substance. The fastener assembly secures the front cover 20 to the back plate 10 when the protrusion 36 protrudes through the hole 34.

The front cover 20 also has a plurality of flow holes 22, 23, 24, 25. The front cover 20 further has a left edge 17a and a right edge 17b, which act as rails for engaging a first sliding engagement means 16 and a second sliding engagement means 18 disposed on the back plate 10. The back plate 10 has a back plate body 11 and a drain attachment hole 12. A bottom plate 14 is attached to the back plate 10.

Figure 10:
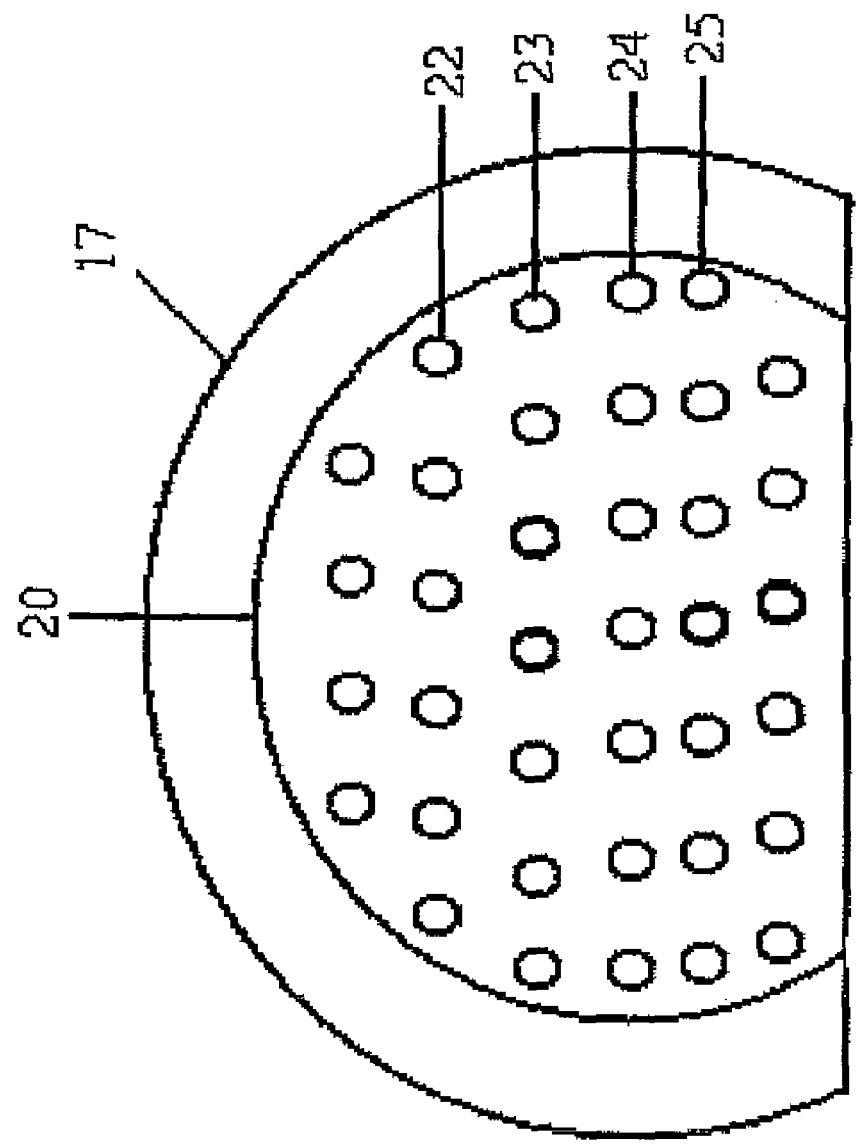
FIG. 10 depicts a front view of an embodiment of the present two part drain assembly having a round front cover.

FIG. 10 depicts a front view of an alternate embodiment of the present two-part drain assembly having a front cover 20 that has semi-round shape. A plurality of flow holes 22, 23, 24, and 25 are disposed on the front cover 20. The front cover 20 has an edge 17, which acts as a rail for slidably engaging sliding engagement means disposed on a complementary back plate. The front cover 20 can be made from a stainless steel mesh or a similar material.

Figure 11:
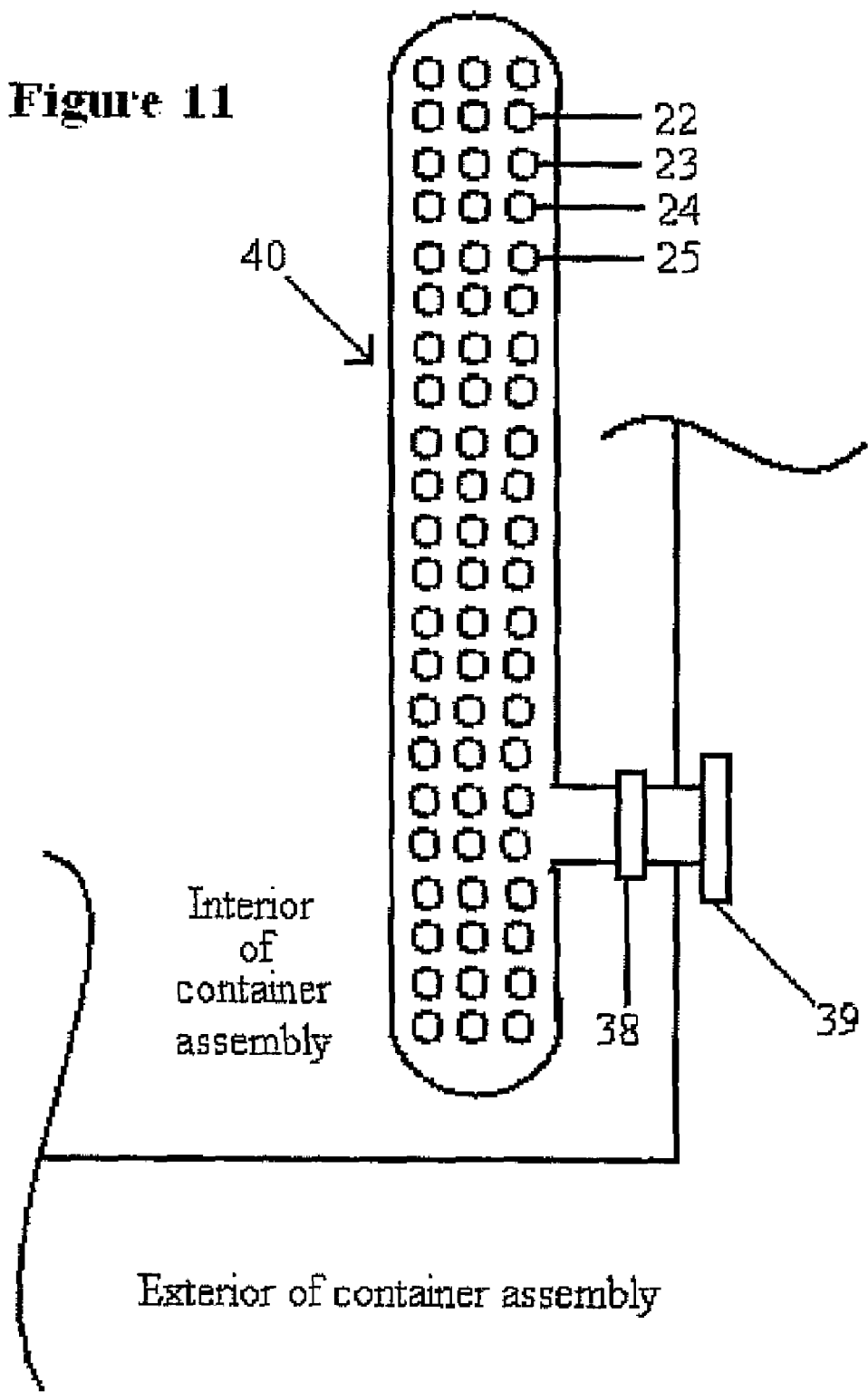
FIG. 11 depicts a side view of an embodiment of the present two part drain assembly having a tubular front cover.

FIG. 11 depicts a side view of another contemplated embodiment of the present two-part drain assembly that is tubular or cylindrical in shape. The tubular drain assembly 40 can be attached a drain hole 37 of a container assembly using a fastening means 38. Fastening means 38 is depicted as a nut but can be any type of fastener. Embedded within the tubular drain assembly 40 are the plurality of drain holes 22, 23, 24, and 25. It is contemplated that liquid can flow from the interior of a container assembly into the tubular drain assembly 40 through the plurality of drain holes 22, 23, 24, 25 while the plurality of drain holes 22, 23, 24, 25 exclude particulates and other solid material from entering the tubular drain assembly 40.

The liquid can then flow out of the tubular drain assembly 40, to a drain cap 39, which is located on the exterior of the container assembly and can allow the fluid to exit the container assembly.

Figure 12:
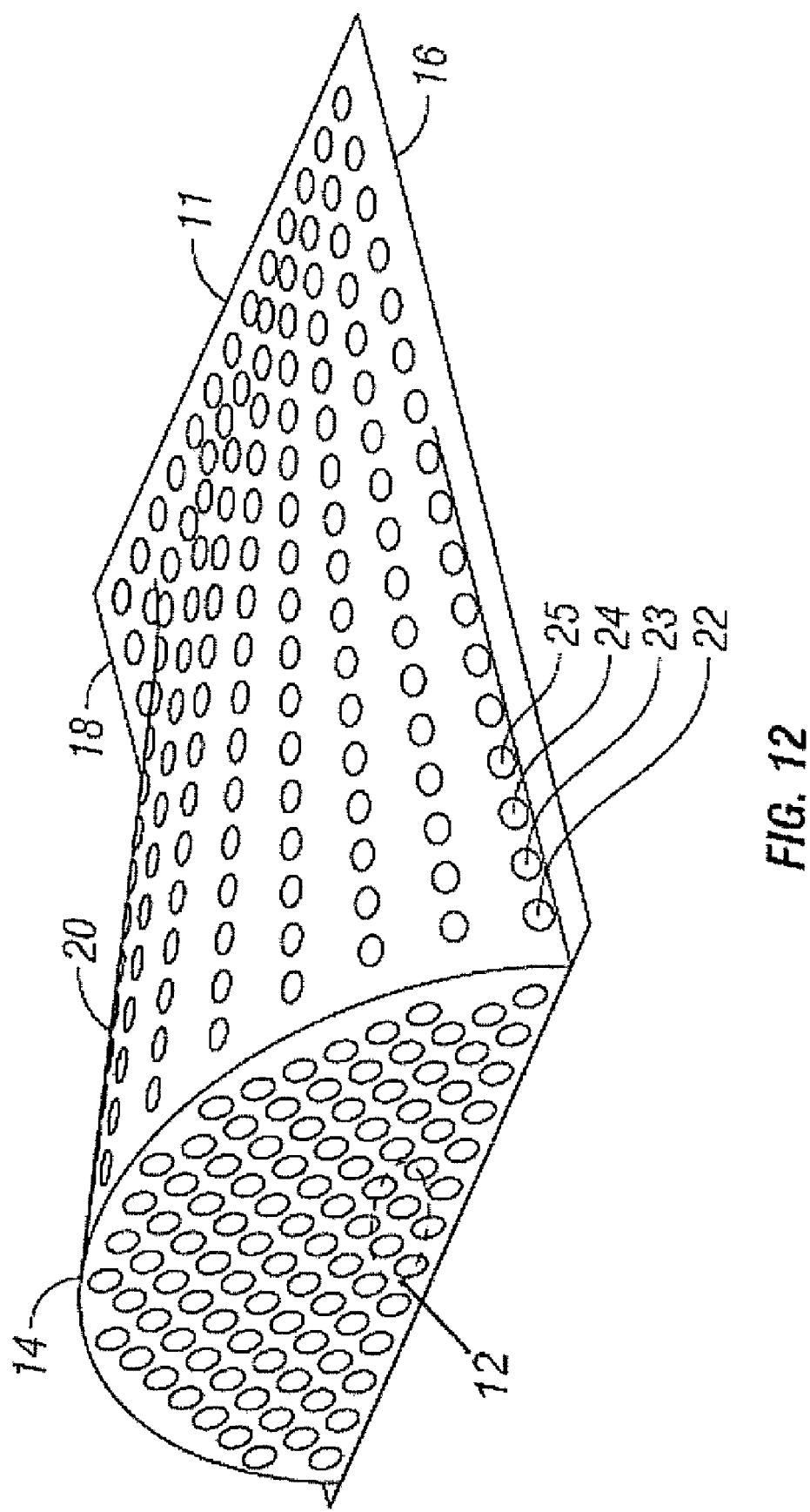
FIG. 12 depicts a perspective view of an embodiment of the present two part drain assembly having a rounded front cover.

FIG. 12 depicts a perspective view of an embodiment of the present two-part drain assembly having a rounded front cover. Back plate body 11 having first sliding engagement means 16 and second sliding engagement means 18 is shown with front cover 20 slidably engaging back plate body 11. Front cover 20 is rounded in shape, having a semi-circular, or "D" shaped cross section. Bottom plate 14 is depicted attached to back plate body 11.

A plurality of holes 22, 23, 24, 25 are disposed in front cover 20. FIG. 12 also depicts holes disposed in bottom plate 14, however it is contemplated that these holes are optional and that bottom plate 14 can lack holes. Drain attachment hole 12 is disposed within back plate body 11.

Figure 13:
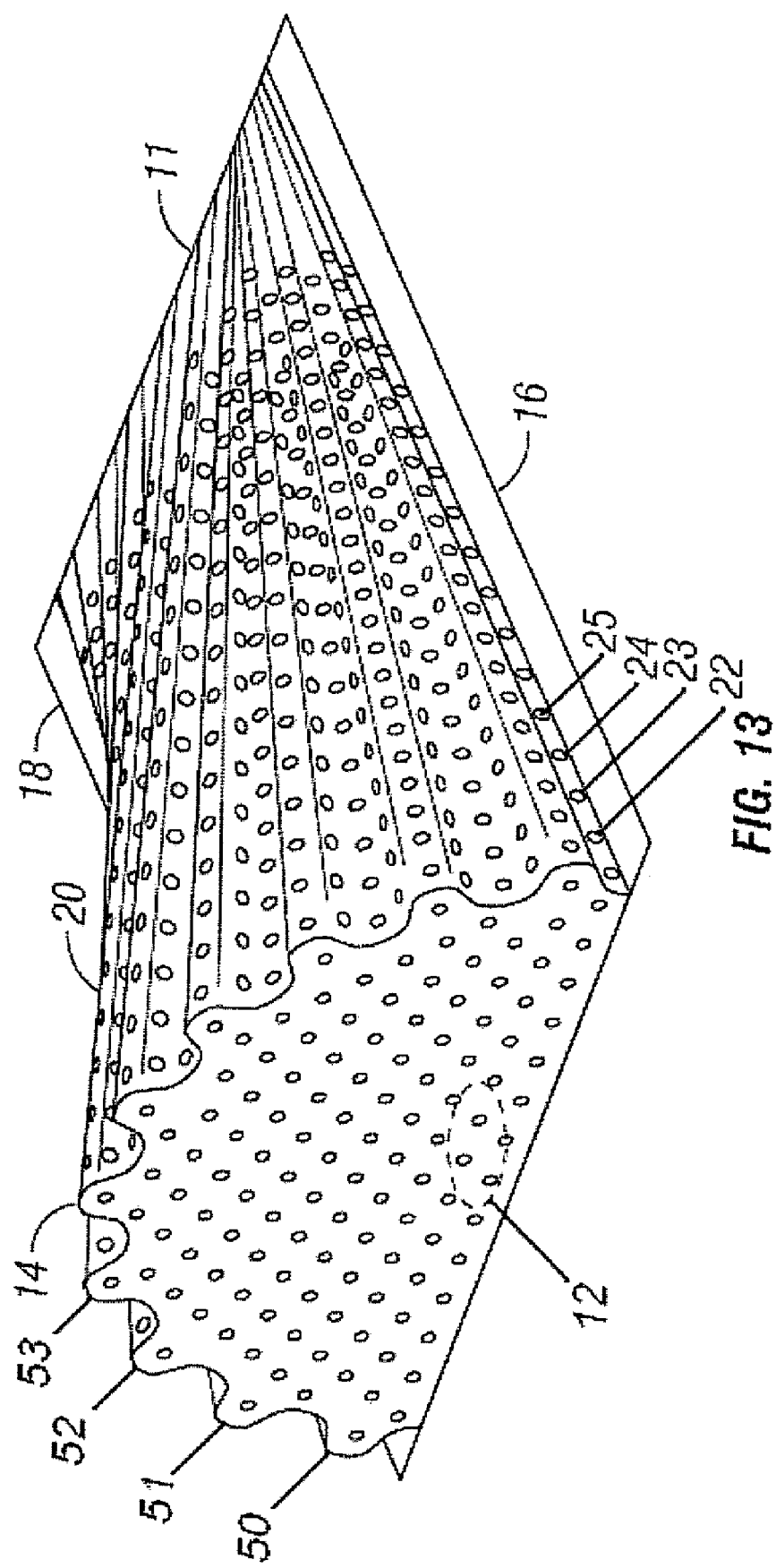
FIG. 13 depicts a perspective view of an embodiment of the present two part drain assembly having a front cover with a curved, sine-wave surface.

FIG. 13 depicts a perspective view of an embodiment of the present two-part drain assembly having a curved front cover with a corrugated, sine-wave configuration. Back plate body 11 having first sliding engagement means 16 and second sliding engagement means 18 is shown with front cover 20 slidably engaging back plate body 11. Front cover 20 includes a plurality of curves, 50, 51, 52, 53, causing front cover 20 to have a corrugated, sine-wave cross section. Bottom plate 14 is depicted attached to back plate body 11.

A plurality of holes 22, 23, 24, 25 are disposed in front cover 20. FIG. 13 also depicts holes disposed in bottom plate 14, however it is contemplated that these holes are optional and that bottom plate 14 can lack holes. Drain attachment hole 12 is disposed within back plate body 11.

Figure 14:
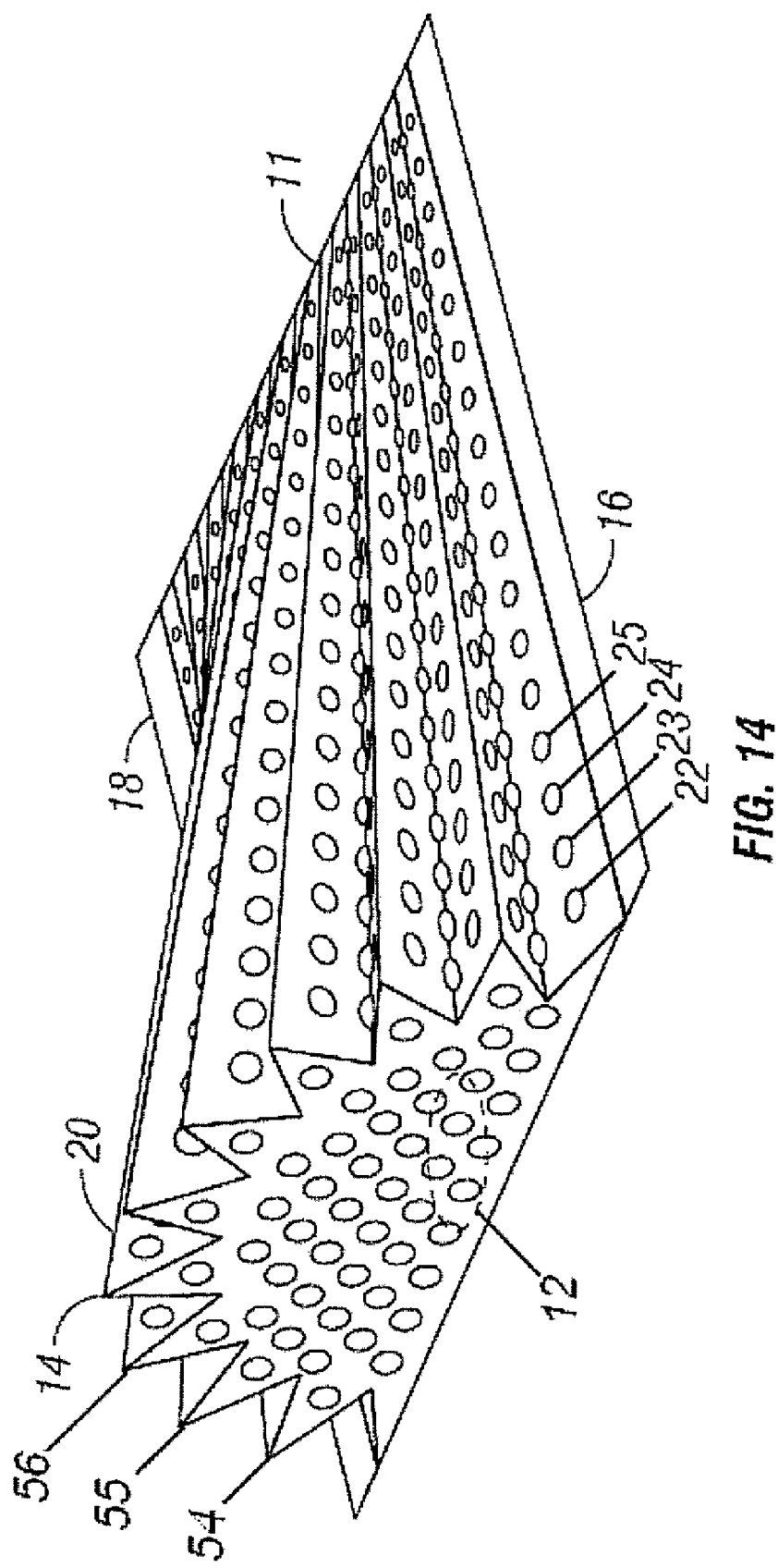
FIG. 14 depicts a perspective view of an embodiment of the present two part drain assembly having a front cover with a jagged surface with accordion folds.

FIG. 14 depicts a perspective view of an embodiment of the present two-part drain assembly having a jagged front cover with an angular, accordion-fold configuration. Back plate body 11 having first sliding engagement means 16 and second sliding engagement means 18 is shown with front cover 20 slidably engaging back plate body 11. Front cover 20 includes a plurality of spikes, 54, 55, 56 causing front cover 20 to have an angular, accordion-folded cross section. Bottom plate 14 is depicted attached to back plate body 11.

A plurality of holes 22, 23, 24, 25 are disposed in front cover 20. FIG. 14 also depicts holes disposed in bottom plate 14, however it is contemplated that these holes are optional and that bottom plate 14 can lack holes. Drain attachment hole 12 is disposed within back plate body 11.

Figure 15:
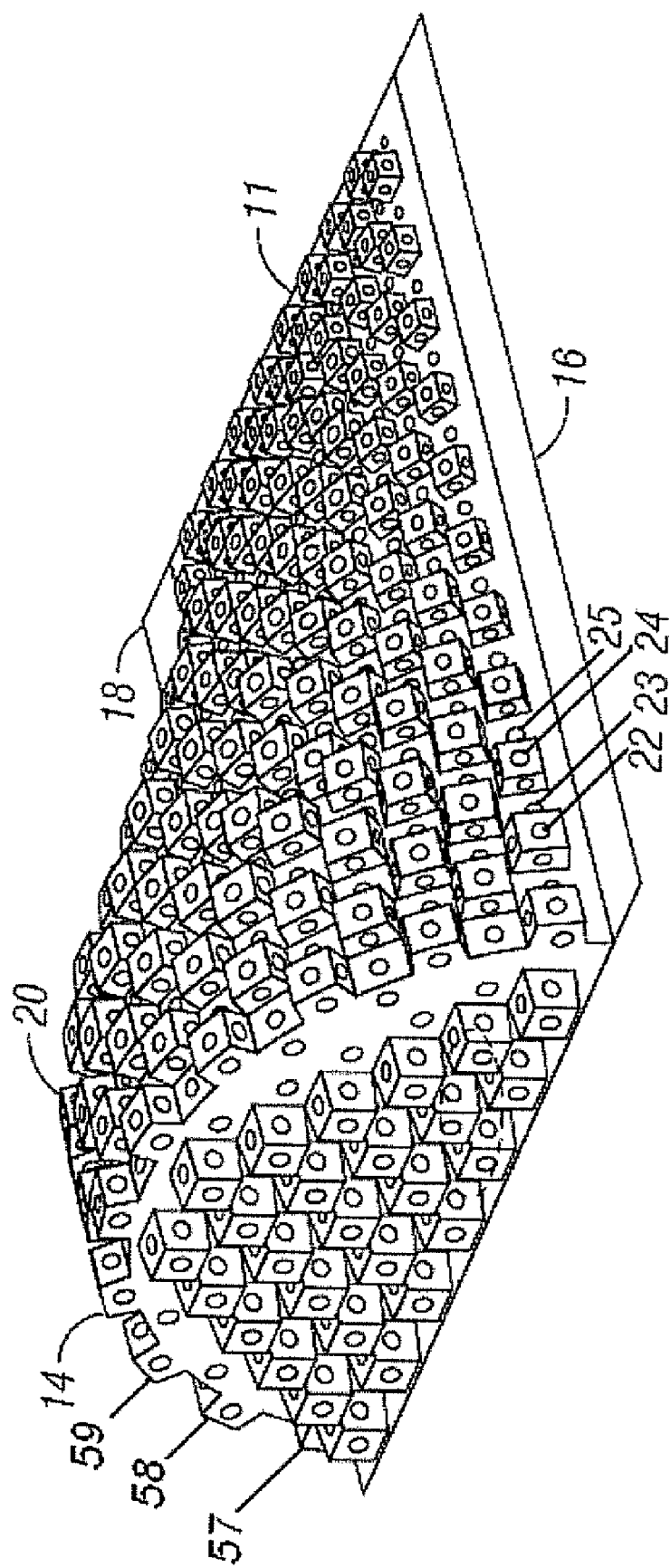
FIG. 15 depicts a perspective view of an embodiment of the present two part drain assembly having a studded front cover with square-top pyramid protrusions.

FIG. 15 depicts a perspective view of an embodiment of the present two-part drain assembly having a studded front cover having an egg carton-like configuration. Back plate body 11 having first sliding engagement means 16 and second sliding engagement means 18 is shown with front cover 20 slidably engaging back plate body 11. Front cover 20 includes a plurality of staggered studs 57, 58, 59, each stud having a square-top pyramid shape with a hole disposed on each side and on the top of each stud. It is contemplated that each staggered stud 57, 58, 59 could have any shape and any number of holes along any portion of the shape. Bottom plate 14 is depicted attached to back plate body 11.

A plurality of holes 22, 23, 24, 25 are disposed in front cover 20, including along each side and on top of each of the staggered studs 57, 58, 59. FIG. 15 also depicts holes disposed in bottom plate 14, and studs disposed on bottom plate 14, however it is contemplated that these holes and studs are optional and that bottom plate 14 can lack holes and have a flat configuration.

While these embodiments have been described with emphasis on the embodiments, it should be understood that within the scope of the appended claims, the embodiments might be practiced other than as specifically described herein.

What is claimed is:

1. A two part removable drain assembly for a container assembly with a drain for flowing fluid from an interior of the container assembly to an exterior of the container assembly, wherein the two part drain assembly comprises:
    a back plate comprising:
        a back plate body comprising a drain attachment hole for communication with the drain, wherein the drain attachment hole has means for securing the drain attachment hole to the drain of the container assembly;
        a first sliding engagement means connected to the back plate body, the first sliding engagement means including a track for receiving a rail;
        a second sliding engagement means connected to the back plate body, the second sliding engagement means including a track for receiving a rail;
        a bottom plate connected to the back plate body, the bottom plate having one or more flow holes;
    a front cover comprising a plurality of flow holes, wherein each of the plurality of flow holes has a diameter ranging from eleven sixty fourths of an inch to two inches, wherein the front cover slidably engages the first sliding engagement means and the second sliding engagement means simultaneously, and wherein the front cover and the back plate define an enclosed hollow chamber between the front cover and the back plate permitting fluid to flow from the interior of the container assembly into the enclosed hollow chamber while excluding particles from entering the enclosed hollow chamber;
    a fastener assembly located within each of the sliding engagement means for securing the front cover to the back plate for locking the sliding engagement of the front cover and the back plate; and
    wherein the fluid flows from the enclosed hollow chamber through the drain attachment hole and the drain to the exterior of the container assembly, preventing the drain from clogging, thereby maintaining an unclogged drain.

2. The two part drain assembly of claim 1, wherein the bottom plate provides a sliding tight fit with the first sliding engagement means and the second sliding engagement means.

3. The two part drain assembly of claim 1, wherein the plurality of flow holes comprise from ten holes to 100 holes.

4. The two part drain assembly of claim 3, wherein the plurality of flow holes are arranged in a staggered arrangement.

5. The two part drain assembly of claim 1, wherein the container assembly is a portable container assembly.

6. The two part drain assembly of claim 1, wherein the back plate and the front cover each comprise one piece molded plastic, molded polyvinyl chloride, polypropylene, copolymers of polypropylene, stainless steel, stainless steel wire mesh, galvanized wire mesh, plastic coated wire mesh, galvanized stainless steel, porcelain, ceramic, or another material able to sustain a temperature ranging from −40 degrees Fahrenheit to 500 degrees Fahrenheit without breaking.

7. The two part drain assembly of claim 1, wherein the front cover is triangular in shape having a tapered top for engaging the back plate.

8. The two part drain assembly of claim 1, wherein the bottom plate has a shape selected from the group consisting of: a "D" shape, a rectangular shape, a semi-round shape, or a tubular shape.

9. A container assembly with a drain assembly holder embedded within an interior of the container assembly, wherein the container assembly comprises:
    an insulated shell with a drain for flowing fluid from the interior of the container assembly to an exterior of the container assembly, preventing the drain from clogging, thereby maintaining an unclogged drain;
    a back plate secured substantially flush to the interior of the container assembly, wherein the back plate comprises:

a back plate body comprising a drain attachment hole in communication with the drain;

a first sliding engagement means connected to the back plate body, the first sliding engagement means including a track for receiving a rail;

a second sliding engagement means connected to the back plate body, the second sliding engagement means including a track for receiving a rail;

a bottom plate connected to the back plate body, the bottom plate having one or more flow holes;

a front cover comprising a plurality of flow holes for filtering fluid wherein the back plate is adapted for slidably engaging the front cover; wherein each of the plurality of flow holes has a diameter ranging from eleven sixty fourths of an inch to two inches, a fastener assembly located within each of the sliding engagement means for securing the front cover to the back plate and for locking the sliding engagement of the front cover and the back plate; and wherein the drain attachment hole has a means for securing the drain attachment hole to the drain of the container assembly.

10. The container assembly of claim 9, wherein the bottom plate provides a sliding tight fit with the first sliding engagement means and the second sliding engagement means.

11. The container assembly of claim 9, wherein the plurality of flow holes comprise from ten holes to 100 holes.

12. The container assembly of claim 9, wherein the plurality of flow holes are arranged in a staggered arrangement.

13. The container assembly of claim 9, wherein the container assembly is a portable container assembly.

14. The container assembly of claim 9, wherein the back plate and the front cover each comprise one piece molded plastic, molded polyvinyl chloride, polypropylene, copolymers of polypropylene, stainless steel, stainless steel wire mesh, galvanized wire mesh, plastic coated wire mesh, galvanized stainless steel, porcelain, ceramic, or another material able to sustain a temperature ranging from −40 degrees Fahrenheit to 500 degrees Fahrenheit without breaking.

15. The container assembly of claim 9, wherein the front cover is triangular in shape having a tapered top for engaging the back plate.

16. The container assembly of claim 9, wherein the bottom plate has a shape selected from the group consisting of: a "D" shape, a rectangular shape, a semi-round shape, or a tubular shape.

17. The two part drain assembly of claim 1, wherein the front cover has an undulated curved surface, further wherein each undulated curve of the undulated curved surface has a height of one half of an inch and a width of one half of an inch.

18. The container assembly of claim 9, wherein the front cover has an undulated curved surface, further wherein each undulated curve of the undulated curved surface has a height of one half of an inch and a width of one half of an inch.

19. The two part drain assembly of claim 1, wherein the back plate is raised from the interior of the container assembly.

20. The two part drain assembly of claim 1, further comprising one or more flow holes disposed in the back plate.

21. The two part drain assembly of claim 1, wherein the front cover comprises a first rail disposed proximate a first edge of the front cover and a second rail opposite the first rail disposed proximate a second edge of the front cover.

22. The two part drain assembly of claim 1, wherein:
   a. the first sliding engagement means is disposed proximate a first side edge of the back plate;
   b. the second sliding engagement means is disposed opposite the first sliding engagement means proximate a second side edge of the back plate;
   c. wherein each sliding engagement means extends from a bottom edge of the back plate to a top edge of the back plate; and
   d. further wherein the drain attachment hole is disposed between the first sliding engagement means and the second sliding engagement means.

23. The container assembly of claim 9, further comprising one or more flow holes disposed in the back plate.

24. The container assembly of claim 9, wherein the front cover comprises a first rail disposed proximate a first edge of the front cover and a second rail opposite the first rail disposed proximate a second edge of the front cover.

25. The container assembly of claim 9, wherein:
   a. the first sliding engagement means is disposed proximate a first side edge of the back plate;
   b. the second sliding engagement means is disposed opposite the first sliding engagement means proximate a second side edge of the back plate;
   c. wherein each sliding engagement means extends from a bottom edge of the back plate to a top edge of the back plate; and
   d. further wherein the drain attachment hole is disposed between the first sliding engagement means and the second sliding engagement means.

\* \* \* \* \*